United States Patent [19]

Toth et al.

[11] Patent Number: 5,191,317
[45] Date of Patent: Mar. 2, 1993

[54] LOW AIR WARNING SYSTEM FOR SCUBA DIVERS

[75] Inventors: Douglas J. Toth, Huntington Beach, Calif.; Steven J. Shankle, Redmond; Eric R. Brooks, Mukilteo, both of Wash.

[73] Assignee: Undersea Industries, Inc., Rancho Dominguez, Calif.

[21] Appl. No.: 756,526

[22] Filed: Sep. 9, 1991

[51] Int. Cl.⁵ .................................. G08B 21/00
[52] U.S. Cl. ...................... 340/676; 128/201.22; 128/205.23; 137/81.2; 340/531; 340/691; 340/815.1; 340/815.01
[58] Field of Search ............ 340/626, 691, 531, 815.1, 340/815.01; 137/81.2, 557; 128/201.22, 205.23

[56] References Cited

U.S. PATENT DOCUMENTS

| | | | |
|---|---|---|---|
| 3,452,347 | 6/1969 | Stimson | 340/691 |
| 3,670,575 | 6/1972 | Emerick | 128/205.23 |
| 3,875,801 | 4/1975 | Bishaf | 128/208.23 |
| 4,057,783 | 11/1977 | Blanchier | 340/531 |
| 4,424,458 | 1/1984 | Buck et al. | 340/691 |
| 4,800,373 | 1/1989 | Mayz | 137/81.2 |
| 4,929,936 | 5/1990 | Friedman et al. | 340/815.1 |

Primary Examiner—Glen R. Swann, III
Attorney, Agent, or Firm—Leonard Tachner

[57] ABSTRACT

A low air warning system for scuba divers in which a pressure switch and an electromagnetic transmitter are positioned at or near the high pressure air supply tank of the scuba diver and a corresponding electromagnetic receiver is positioned on the diver's mask. A plenum extending from the receiver, provides a pair of LED light indicators of two different colors which also oscillate at different frequencies, depending upon the condition of the pressure switch in response to the supply of air in the diver's air supply tank. A unique electromagnetic transmission and receiving system is disclosed which relies upon magnetic induction between a high Q transmitting antenna and a high Q receiving antenna in the form of LC tank circuits. One of the novelties of the present invention is the use of frequency modulation and the use of distinct modulating tone frequencies which produce one or the other of two signals to activate one or the other of two LEDs of different colors and at different activation frequencies. Changes in both the color and frequency of the flashing light virtually assure that the diver cannot ignore a change in the status of his air supply when it has been reduced sufficiently to fall below a threshold that is sensed by a pressure attached to a valve on the tank.

16 Claims, 8 Drawing Sheets

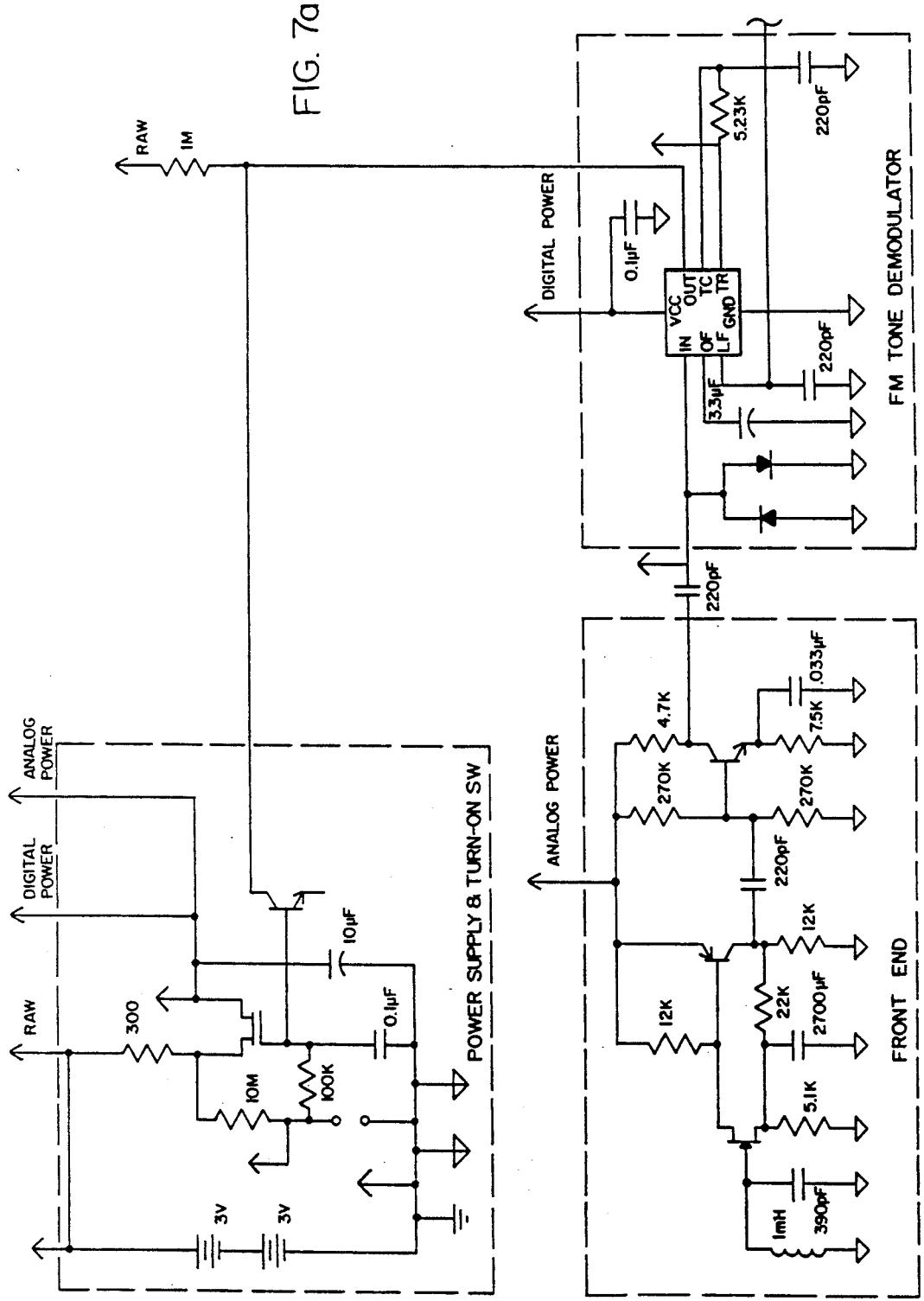

LOW AIR WARNING SYSTEM FOR SCUBA DIVERS

BACKGROUND OF THE INVENTION

1. Field of the Invention

The present invention relates generally to equipment for scuba divers and more specifically to a low air warning system which senses the air pressure in the diver's air supply tank cylinder and provides a visual indication at the diver's face mask as to whether the air tank pressure is sufficient or is dangerously low, thereby relieving the diver of any overt action necessary to determine the status of his air supply during the dive.

2. Prior Art

Even scuba divers who have the best equipment may get involved in what they are working on or observing and then not having checked the cylinder pressure gauge, find themselves with insufficient air to get safely to the surface. The present invention is designed to overcome this potential safety hazard by providing a visual warning of a low pressure condition at the diver's mask and in a manner wherein the diver cannot help but notice the status of the air pressure in the supply tank. One of the key features of the present invention is the use of a wireless transmission system between a transmitter located at or near the air pressure supply tank and a receiver located on the diver's mask, thereby obviating the use of any direct wiring cables and the like which could otherwise interfere with the diving function and create another hazard. In addition to having a wireless link that is not subject to interruption by adverse conditions normally encountered while diving, the preferred low air pressure warning system must be safe, reliable, low cost, have low power consumption, it must have a simple display that is readily observable by the diver and it must not interfere with similar units operating within distances normal to the buddy system of scuba diving. Furthermore, from a marketing standpoint, the system should function in the dive shop the same as it does in the water to allow for easy demonstration by marketing personnel.

There are a number of previously issued U.S. Patents which relate to relevant subject matter. By way of example, U.S. Pat. No. 3,712,714 to Uyeda et al, is directed to an information display system for use with a diver's face mask. The information display provides a display of a plurality of status indicators adapted for visualization within the diver's field of view. Indications such as tank pressure are included among those which could be displayed. Unfortunately, the displays discussed in this patent are of an analog nature, much the same as are currently used in a conventional manner, such as by means of meters strapped to the diver's wrist or the like. Thus, the only distinction of this prior art device is that the normally used displays are located in the mask. However, there is no discussion of the manner in which the information is derived or transmitted to the mask display, nor is there any remedy for the aforementioned preoccupation with other functions during the dive which would, of necessity, alert the diver to the fact that the air supply has reached a perilously low level, warning of the immediate need to begin an ascent to the surface.

U.S. Pat. No. 3,119,990 to Warth is directed to a pressure alarm for scuba diving equipment. A lamp may be coupled to the diver's mask for indicating a low pressure condition. However, coupling between the pressure sensor and the indicator is provided by a pair of leads, as opposed to a wireless connection. Accordingly, this patent teaches the use of a device which overcomes some of the deficiencies of the previously noted patent in regard to the type of visualization of low pressure status. However, it does not overcome the aforementioned disadvantage of having a physical hardwire connection that potentially may interfere with diving functions and thus present a further hazard.

U.S. Pat. No. 4,360,253 to Wyatt is directed to a test result indicator mounted on an operator's safety glasses. This invention discloses the use of a light emitting diode mounted to a transparent eye covering within the field of view of the user for indicating a status condition. However, here again hard wiring is utilized between the condition sensing device and the display.

U.S. Pat. No. 3,587,038 to Massa Jr. is directed to an ultrasonic homing beacon and communication equipment for underwater swimmers. This system utilizes ultrasonic transducers as a form of wireless communications for underwater purposes.

U.S. Pat. No. 4,757,714 to Purdy et al is directed to a speed sensor and head-mounted display for data derived therefrom. FIG. 10 of this patent shows a scuba diver's mask incorporating a display to provide information such as depth, pressure and the status of the air supply. The preferred embodiment illustrated therein is primarily used by skiers and provides a visual display that enables skiers to observe the measured speed of their motion relative to the underlying surface by means of a Doppler shift measurement. The preferred embodiment illustrates the use of a hardwired cable between the sensing element and the display, but refers in general terms to the use of a wireless transmission system using electromagnetic energy. Unfortunately, this patent does not disclose the manner in which suitable electromagnetic transmission for underwater purposes could be utilized in a practical manner, and as previously indicated the use of a hardwire cable for connecting the sensing element to the display would likely interfere with and thus present a hazard to the scuba diver which could be as severe as the hazard to which the present invention is directed.

U.S. Pat. No. 4,800,373 to Mayz is directed to a low pressure warning device for use by scuba divers wherein the device attaches to a fitting on the high pressure stage of the air tank and provides both audible and visual indications in a two stage warning format, indicating a first low pressure condition and a second dangerously low pressure condition. Unfortunately, this patent also discloses the use of a hardwire interconnection between the low pressure sensors and the warning devices, thereby making the system impractical for use by scuba divers in a safe manner as previously described.

There thus still exists a need for a practical, safe, low cost and reliable low air pressure warning system providing a visual indication which cannot be ignored by a scuba diver when tank pressure has become perilously low. Furthermore, this need extends to a system which does not require the use of hardwire interconnection between the sensor and the visual display which would otherwise potentially interfere with the diving function and present a safety hazard which could be significant and which could also affect reliability. Reliability is of particular concern in a system upon which the diver will learn to rely for indicating when to begin an ascent with the remaining air pressure that is at least adequate to enable safely reaching the surface before the air supply has been fully exhausted.

SUMMARY OF THE INVENTION

The present invention meets the aforementioned needs by providing a low air warning system for scuba divers which overcomes the previously noted deficiencies of the prior art. More specifically, the present invention provides an extremely reliable, low cost, low air warning system utilizing electromagnetic transmission from a transmitter mounted near the air tank supply and coupled to a pressure sensor which is directly mounted to the high pressure port of the air tank valve. A separate receiver is mounted directly on the diver's face mask and is connected by means of a plenum to visual displays in the form of light emitting diodes of different colors which are operated at different frequencies. One such color and frequency provides the diver with the visual indication of the satisfactory level of air in the air tank supply and the other color and frequency provides the diver with an indication that the air tank supply is below a predetermined threshold level. The transmitter of the present invention employs a precision oscillator running at 250 kHz. The output of this oscillator is divided into separate output frequencies to generate two separate frequencies, namely, 7.8 kHz, and 3.9 kHz. The 250 kHz frequency signal also provides a carrier, frequency modulated by the 7.8 kHz signal, a red tone signal designated to indicate low air pressure or the 3.9 kHz signal, a green tone signal designated to indicate adequate air pressure. The two color tone frequency signals are applied to a tone selector which configures the duty cycles of the two tone signals and the selects one or the other depending upon the pressure sensed by a pressure switch. The resulting tone selector output then modulates the 250 kHz carrier signal. The modulated carrier is passed through a waveform squarer and through an output section which drives an inductor/capacitor or tank circuit.

A minute portion of the transmitter's changing magnetic field is sensed by the receiver's inductive ferrite antenna, causing a current to flow through the inductor windings. The windings of the inductor form part of a resonant tank circuit, generating a voltage signal which is applied to the gate of a field effect transistor first stage in a front-end amplifier. When the signal has been amplified sufficiently, it is passed to a phase-locked loop demodulator to strip off the carrier signal and produce either one or the other of the demodulated tones. The demodulated tone is then buffered and passed onto both the red and green tone decoders. When either of these decoders senses the tone to which it is tuned, it closes the circuit of the appropriately colored light emitting diode which is mounted at the face plate of the diver's mask to produce a readily observable visual indication in both color and frequency of the status of the air pressure supply in the diver's air tank.

It will be seen hereinafter that the warning system of the present invention meets all of the noted requirements for safety, reliability, low cost, low power consumption, non-interference from similar systems used by nearby divers, a simple display and a demonstrable unit for marketing purposes, while most importantly providing a wireless link which cannot be interrupted by adverse conditions normally encountered while diving.

OBJECTS OF THE INVENTION

It is therefore a principal object of the present invention to provide a low air warning system for use by scuba divers, wherein a wireless communication link provides readily observable visual indications of the status of the diver's air pressure supply at the diver's face mask and in a manner which is virtually impossible for the diver to ignore and does not require interpretation of any data such as is conventionally provided in the form of an analog indication of pressure level.

It is still an additional embodiment of the present invention to provide a low air warning system for scuba divers, wherein two visual indications are provided at the diver's face mask, one of which assures the diver of the satisfactory status of his air pressure supply and the other of which provides an immediately recognizable indication of a low pressure status, indicating air supply has fallen below a predetermined threshold and the need for an immediate ascent to the surface.

It is still an additional object of the present invention to provide a low air warning system for scuba divers which utilizes an electromagnetic wireless link between a pressure sensor and a face mask indicator, the wireless link being in the form of a magnetically-induced transmission that is adequate to cover the distance between a transmitter and a receiver mounted on the diver's tank and face mask respectively, while minimizing the possibility of interference from other sources of magnetic energy, such as other nearby divers using a similar low air warning system.

It is still an additional object of the present invention to provide a wireless link, low air warning system for scuba diving in which the diver is provided with two visual indications that are distinct in both color and frequency, one of which is designed to provide an indication of adequate air supply and the other of which is designed to provide an indication of a potentially inadequate air supply.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 6, comprising FIG. 7, comprising FIGS. 7a and 7b is a schematic representation of the receiver of the present invention.

DETAILED DESCRIPTION OF A PREFERRED EMBODIMENT

Figure 1:
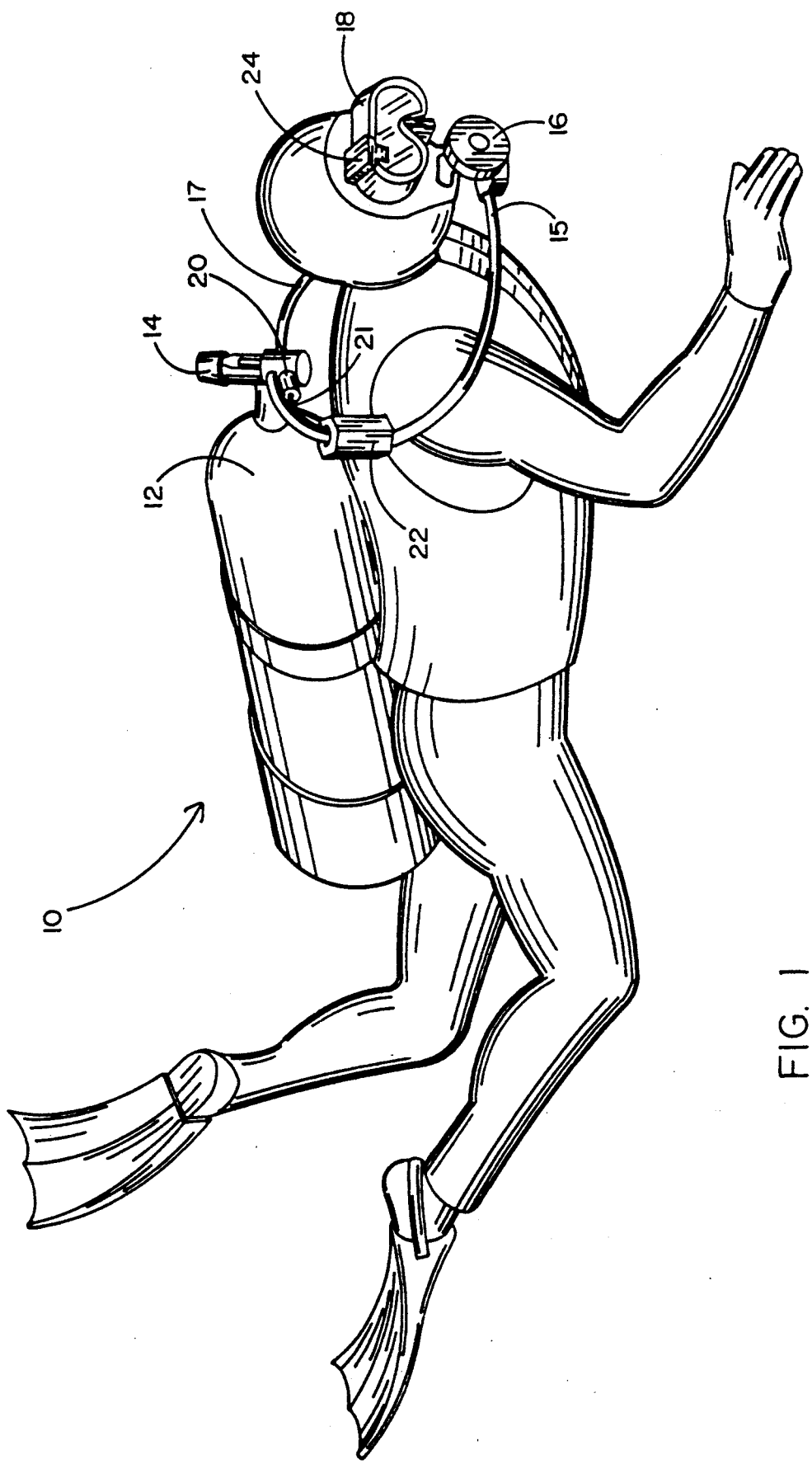
FIG. 1 is an illustration of a scuba diver using the low air warning system of the present invention.

Referring now to FIG. 1, it will be seen that there is shown therein a scuba diver 10, having as standard scuba diving equipment an air supply tank or cylinder 12 to which is connected a first stage pressure regulator 14 and a hose 15 connecting the first stage regulator to a second stage regulator 16. Also connected to the first stage pressure regulator 14 is a high pressure hose 17 which is normally connected to an instrument array such as instrument array 19 shown in FIG. 2 and which is normally worn on the diver's wrist or forearm. As also seen in FIG. 1, the scuba diver 10 is wearing a diver's mask 18. The aforementioned gear, namely tank 12, regulators 14 and 16, hoses 15 and 17, mask 18 and instrument array 19 are all relatively conventional scuba diving equipment. However, also shown in FIG. 1, are a pressure switch 20 which is connected by means of a cable 21 to a transmitter 22 and a receiver 24 which is mounted to the diver's mask 18.

Figure 2:
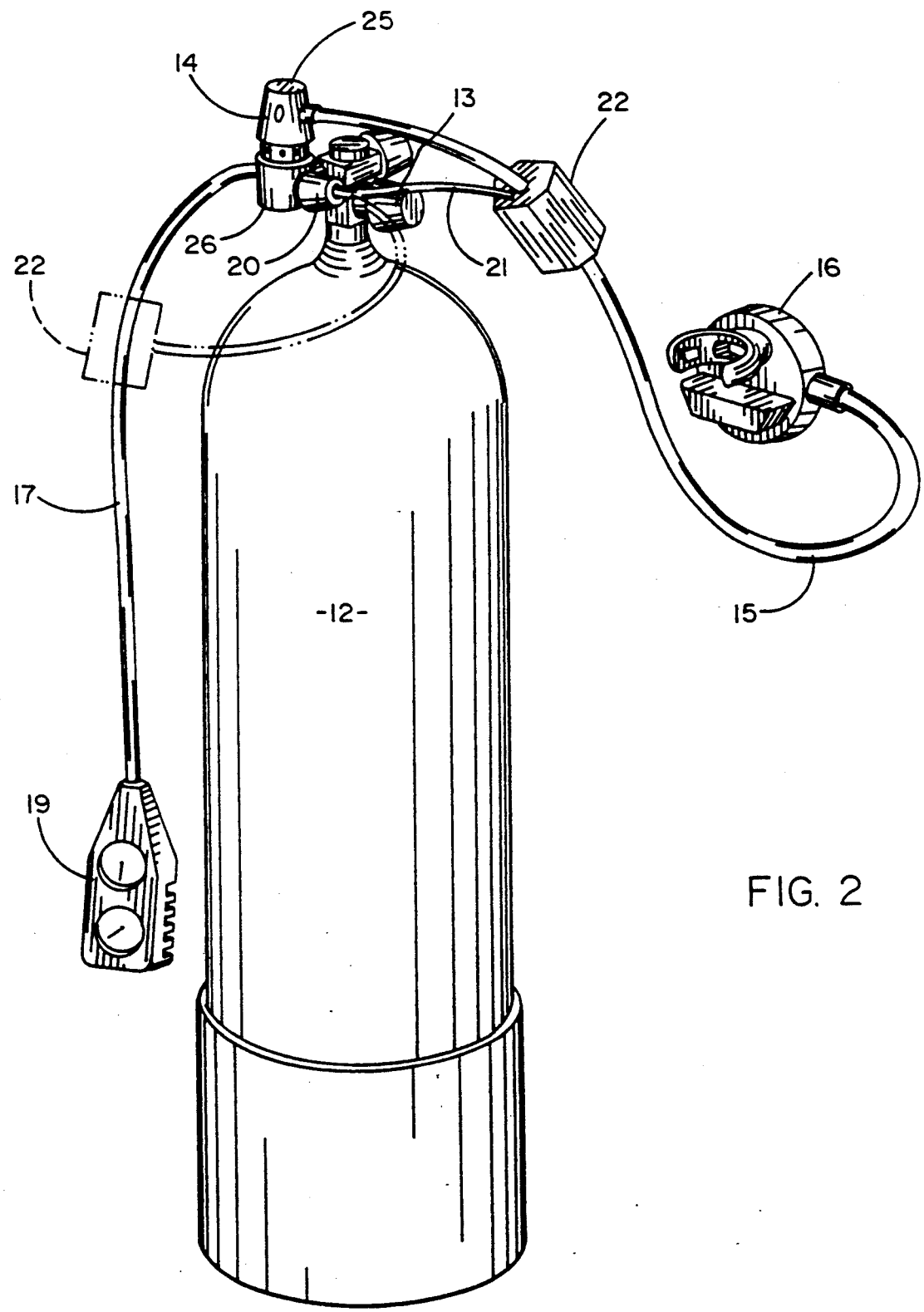
FIG. 2 is an enlarged view of the diver's air tank shown with the pressure transducer and transmitter of the present invention.

Now referring to FIG. 2 it will be seen that the air supply tank or cylinder 12 is provided with a tank valve 13 and with a first stage pressure regulator 14 having a low pressure port 25 and a high pressure port 26. Hose 15 is connected to low pressure port 25 at one end and to second stage regulator 16 at the other. Pressure switch 20 is connected at one end to the high pressure port 26 to be responsive to the pressure within tank 12. Pressure switch 20 is also connected by means of a cable 21 to the transmitter 22. As seen in FIG. 2 the transmitter 22 is preferably mounted along hose 15. This is merely a convenient manner for positioning the transmitter 22 at a location which is near tank 12, but separated sufficiently from tank valve 13 to avoid any interference with the magnetic induction transmission of the transmitter 22. The same may be achieved by positioning the transmitter 22 along the high pressure hose 17, as shown in phantom in FIG. 2, with the transmitter shown in phantom being also labelled reference number 22. As previously indicated, high pressure hose 17 interconnects the tank valve 13 to the instrument array 19 which normally provides analog readout displays of important diving parameters such as air pressure and depth.

Figure 3:
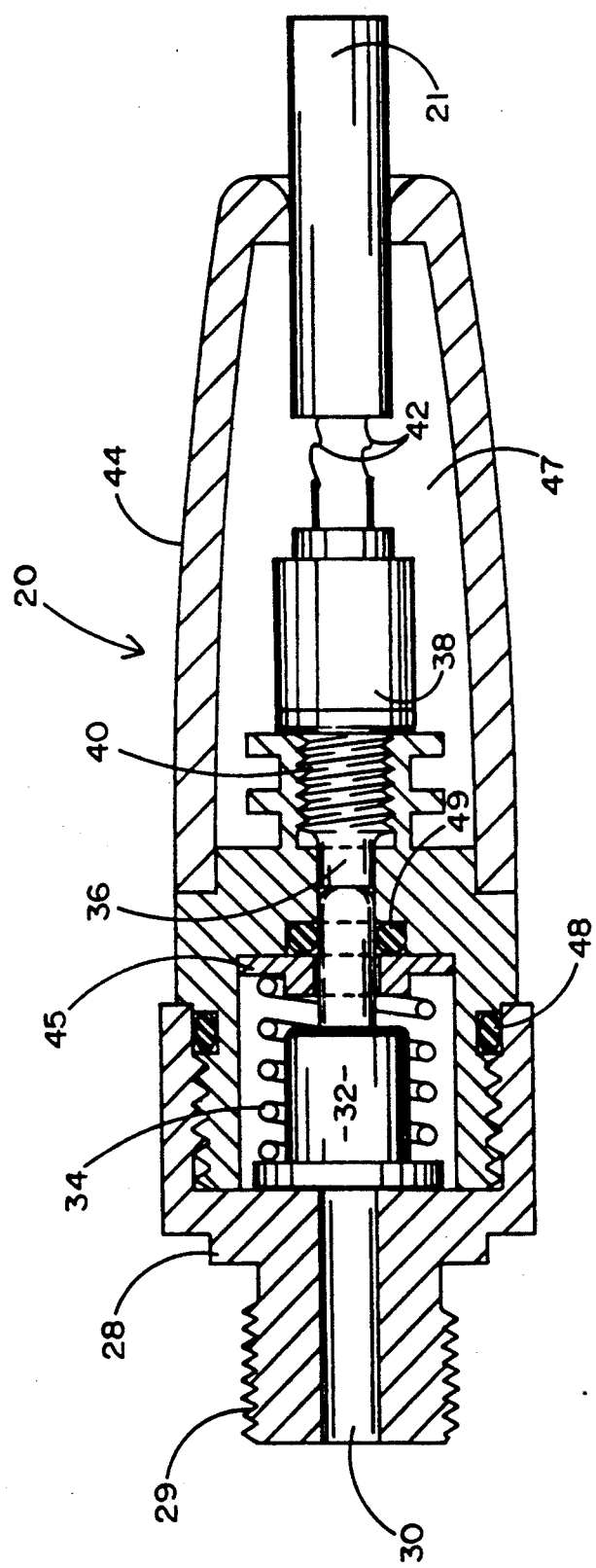
FIG. 3 is an enlarged cutaway view of a pressure switch suitable for use in the present invention.

A more detailed description of the pressure switch 20 may be gained from FIG. 3, which illustrates that pressure switch 20 comprises a two piece housing 28, one end of which provides a threaded connector 29 through which there is an axially positioned high pressure inlet 30. Axially located adjacent the inlet 30 is a piston 32 which is surrounded by a coil spring 34, the latter being positioned relative to the piston by a spring guide 45. Piston 32 is responsive to the level of air pressure within high pressure inlet 30 to move axially for either depressing or not depressing a push button switch 38 and particularly the plunger 36 thereof. The position of the plunger 36 of push button switch 38 may be adjusted by means of a threaded switch height adjustment 40. The output side of push button switch 38 is provided with a pair of switch wires 42 which form the conductors of a cable 21, shown exiting on the rightmost portion of FIG. 3 through the aperture of a cap 44. Cap 44 provides an interior chamber 47 which, in the preferred embodiment of the invention, is fully epoxied for maximum protection of the components of switch 20. O-ring 48 is used to assure the water resistant integrity of the switch 20. O-ring 49 assures a pressure differential across the piston.

Figure 4:
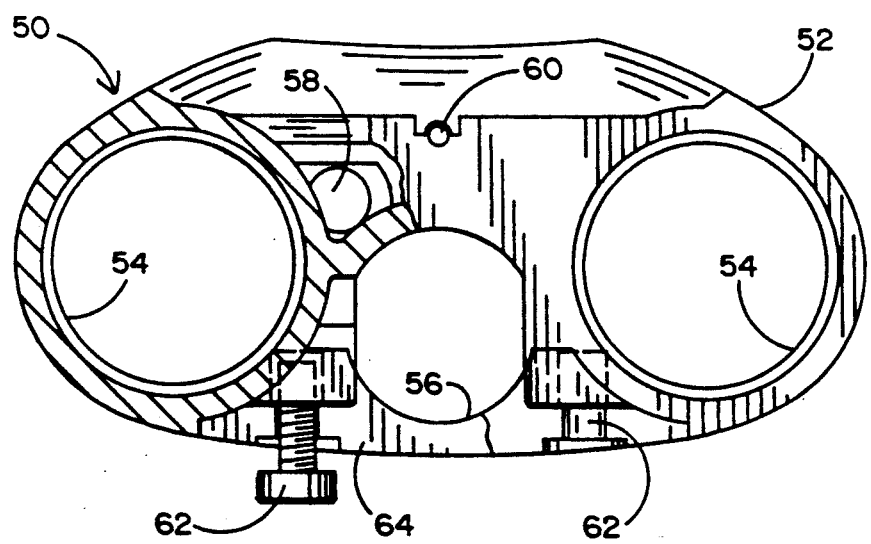
FIG. 4 is a partially cutaway mechanical view of the transmitter portion of the present invention.

Referring now to FIG. 4 it will be seen that the transmitter 22 of the present invention comprises a housing 50, composed of a case 52 and a cover 64. The transmitter housing 50 provides a pair of battery compartments 54 as well as a hose trap 56 and a cable passage 58. There is also provided a pair of wet switch pins 60, which automatically turns the transmitter 22 on whenever it is immersed in water. Four screws 62 secure the cover 64 to the case 52.

Figure 5:
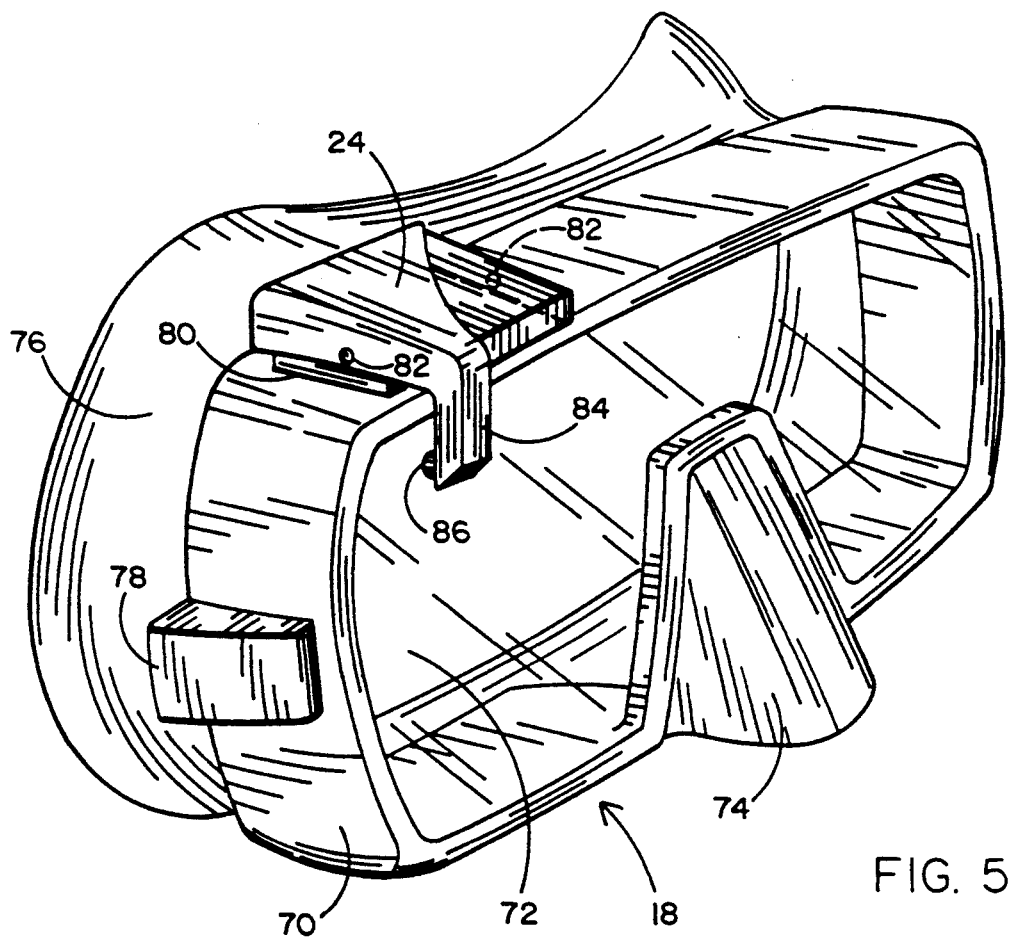
FIG. 5 is an isometric view of the face mask of a scuba diver shown with the receiver and visual indicator of the present invention mounted thereon.

Referring now to FIG. 5, it will be seen that the diver's mask 18 of the present invention comprises a body 70, a face plate 72, a nose piece 74 and a face gasket 76 as well as a strap holder 78. In addition to these conventional dive mask components, there is provided in the present invention a receiver 24 which is mounted to the exterior of body 70 along the top surface thereof, by means of double-sided adhesive tape 80. The exterior of receiver 24 is provided with a pair of wet switch pins 82 which serve the same purpose served by the switch pins in the transmitter 22, namely to activate the receiver whenever it is immersed in water. Receiver 24 is includes a plenum 84 which extends downwardly from the receiver so that it extends partially over the upper portion of face plate 72. The plenum provides a pair of light-emitting diodes 86 which provide the visual representation indicative of either a normal or sub-normal air supply condition, as will be described hereinafter in more detail.

Figure 6A:
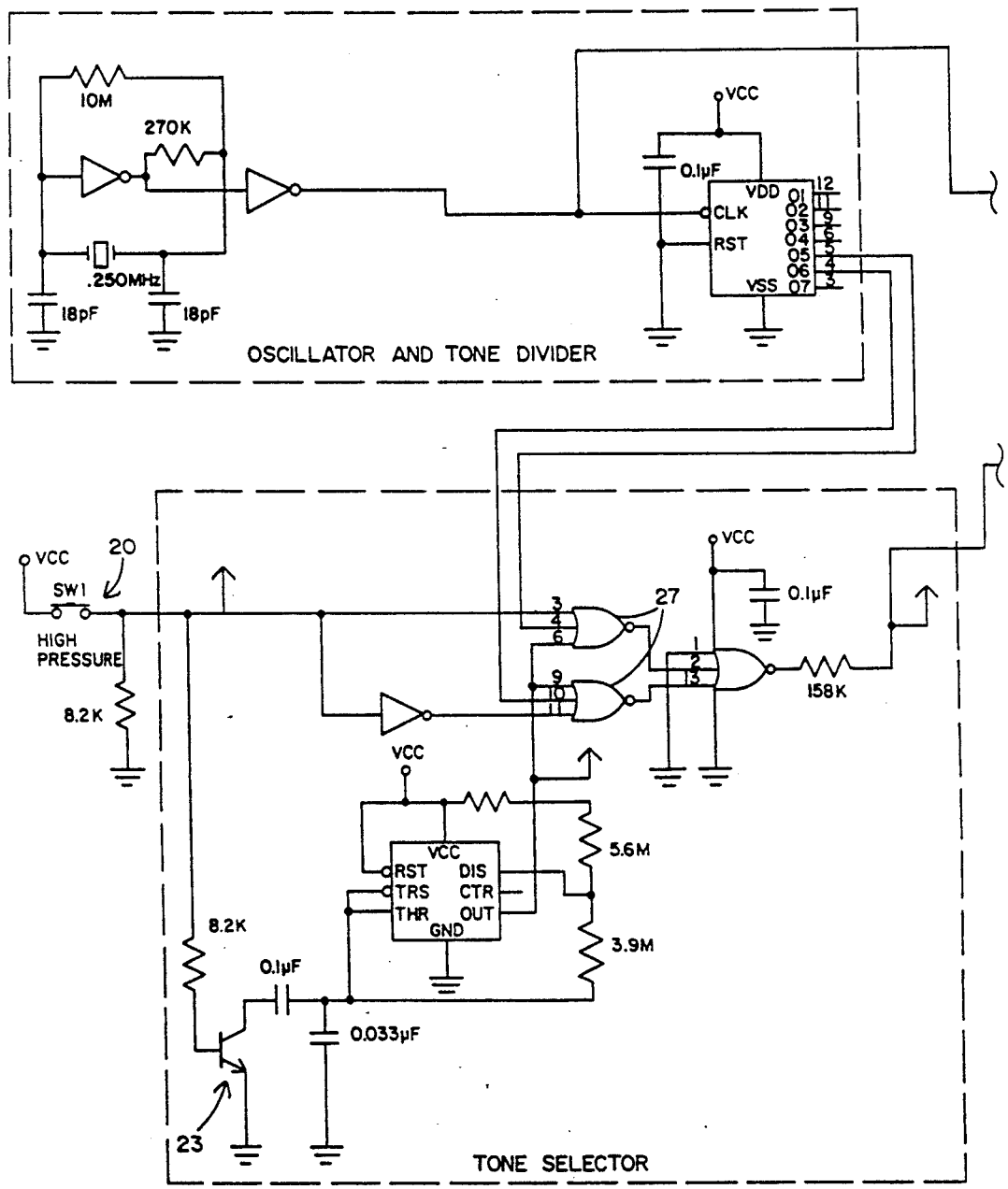
FIGS. 6a and 6b is a schematic representation of the transmitter of the present invention.
Figure 6B:
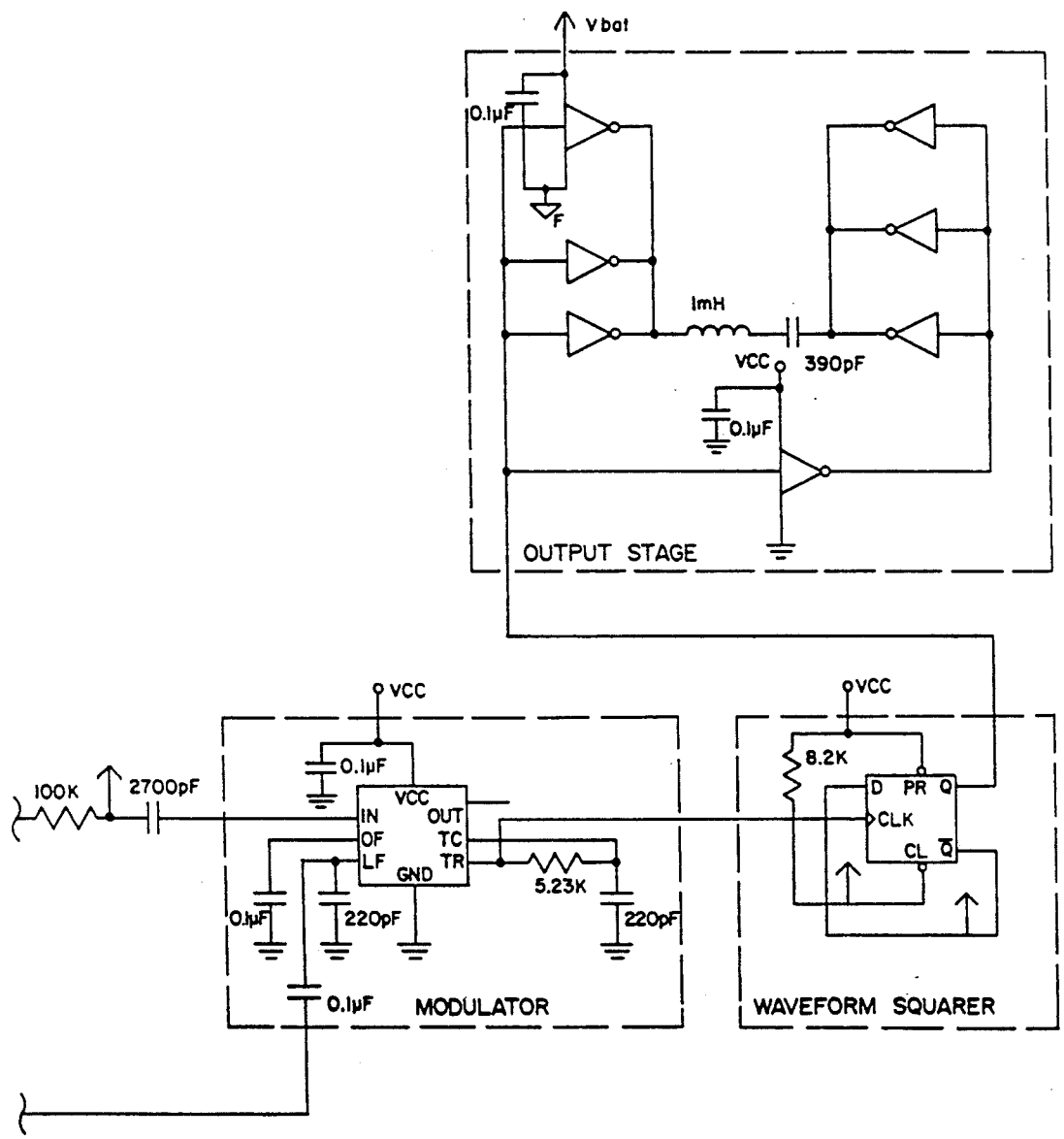

Reference will now be made to FIGS. 6 and 7 for a more detailed discussion of the electrical design of the transmitter 22 and receiver 24, respectively. Referring first to FIG. 6a, it will be seen that the transmitter of the present invention comprises an oscillator and tone divider, a tone selector, a modulator, a waveform squarer and an output stage. The oscillator and tone divider comprises a 250 kHz oscillator having appropriate resistors and capacitors to generate a 250 kHz oscillating signal.. This oscillating signal is applied to the clock input terminal of a seven stage ripple-carry binary counter, two outputs of which, namely Q5 and Q6 are applied to the tone selector. The output of the 250 kHz oscillating signal is also applied to the modulator shown in FIG. 6b and more specifically to the "IN" terminal of a model LMC 568 low power phase-locked loop circuit chip, such as that sold by National Semiconductor. The modulator is an amplitude-linear phase-locked loop, having a linear VCO, balanced phase detectors and a carrier detect output. This chip is commonly used as a demodulator of frequency-modulated and frequency-shift-keyed signals in which a carrier is detected when the phase-locked loop is locked to an input signal with up to plus or minus 15% deviation in carrier frequency. However, in the present invention, this phase-locked loop integrated circuit is employed as a modulator by applying the carrier signal, that is the 250 kHz oscillating signal, to the "IN" terminal of the integrated circuit and applying the modulating tone to the loop filter input to effectively vary the VCO frequency of the integrated circuit in accordance with the tone frequency.

Two modulating tone signals are generated at the Q5 and Q6 outputs of the seven stage binary counter located in the oscillator and tone divider of FIG. 6a. These two signals are applied to the tone selector shown at the lower portion of FIG. 6a. The function of the tone selector is two-fold, namely, to select one of two tone signals, namely a 3.9 kHz tone signal or a 7.8 kHz tone signal and to provide the appropriate duty cycle which is controlled by a timer integrated circuit shown in the tone selector. The timer may be, for example, a model LMC555CN timer. The timing period of the timer in the tone selector is determined by the condition of the high pressure switch 20 which is shown schematically at the left input to the tone selector of FIG. 6a. The open or closed condition of pressure switch 20 also determines which of the two tone frequencies will be generated by the tone selector and applied to the modulator of FIG. 6b. More specifically, the high pressure switch position determines whether the RC time constant of the timer is high or low, depending upon the "ON" condition of a transistor 23. When transistor 23 is "ON", the RC time constant is four times greater than when transistor 23 is in its "OFF" state. Thus, the timer period is in either one of two conditions which have a timing ratio of 4 to 1. The condition of switch 20 also determines which of the NOR gates 27 is placed in a state to respond to the input tone signal. In the present invention, the tone selector circuit element values are selected so that the 3.9 kHz tone signal, which corresponds in the present invention to a satisfactory air supply condition, is generated every other second and the 7.8 kHz tone signal, which corresponds to a low air supply condition, is generated every half second. The only significance to the different tone frequencies is that they may be distinguished from one another in the receiver, as will be described hereinafter, so that one tone signal lights only a red LED and the other lights only a green LED. The manner in which these respective tone signals are separately demodulated and distinguished from one another will be described hereinafter in conjunction with FIG. 7.

The tone signal that is selected by the tone selector of FIG. 6a is applied to the loop filter input of the modulator integrated circuit of FIG. 6b to modulate the 250 kHz carrier signal at the appropriate modulation frequency corresponding to the selected tone. The tone-modulated-carrier signal is available at the TR terminal of the modulator of FIG. 6b which is the output of the internal VCO of the LMC568CM integrated circuit chip. The output of the modulator is applied to the clock input terminal of a waveform squarer shown in the lower righthand corner of FIG. 6b. The waveform squarer is a D-type flip-flop integrated circuit chip, such as a conventional model 74HC74. The Q output of the waveform squarer flip-flop of FIG. 6b is applied to the output stage of the transmitter which provides suitable buffers and a tuned tank circuit comprising a 1 millihenry inductor and a 390 pF capacitor. This tank circuit provides a high Q, (i.e., at least 40) narrow band transmitter antenna which generates the appropriate electromagnetic field for transmission of the frequency modulated 250 kHz carrier having the selected modulating signal thereon.

Figure 7B:
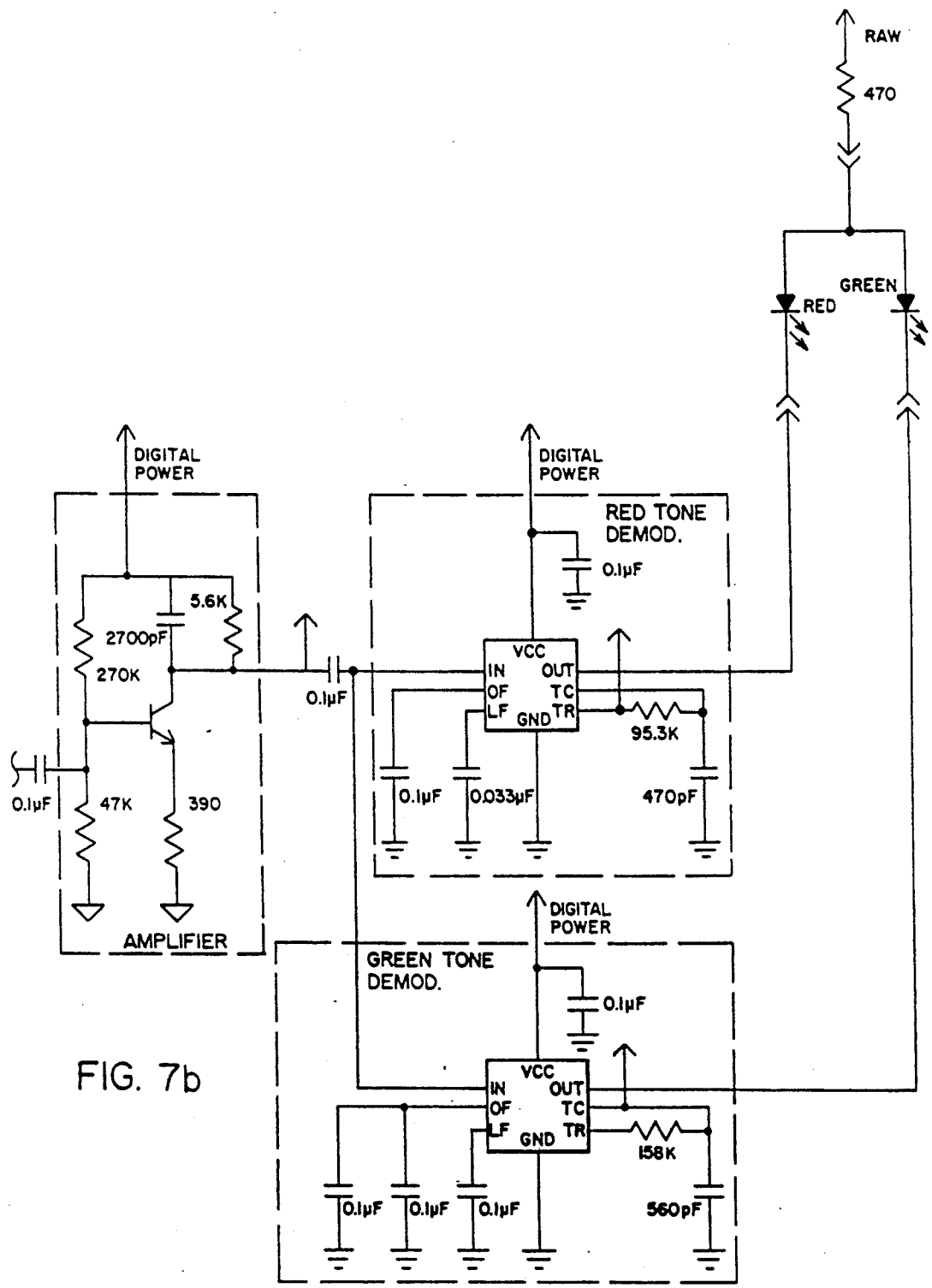

The receiver of the present invention is shown schematically in FIG. 7a and 7b. It comprises a front end, an FM tone demodulator, an amplifier, a pair of tone decoders and corresponding LEDs, as well as a power supply and turn "ON" switch which applies power as required to the various component of the receiver circuit of FIG. 7a and 7b. The front end circuit shown in the lower left-hand portion of FIG. 7a comprises a tuned tank circuit corresponding to that of the transmitter of FIG. 6b, namely a 1 millihenry inductor and a 390 pF capacitor. The remaining portion of the front end circuitry includes an FET first stage amplifier and additional amplifier stages as required to generate the requisite signal amplitude for the FM tone demodulator to which the output of the front end circuit is capacitively coupled. The FM tone demodulator comprises a pair of amplitude-limiting diodes and a low power phase-locked loop, model LMC568IC, which is the same integrated circuit chip that is used in the FM modulator of the transmitter of the present invention shown in FIG. 6. However, in the receiver, the LMC568 low power phase-locked loop integrated circuit is used in its conventional configuration for stripping the carrier signal, namely the 250 kHz oscillating signal from the modulated input to provide either one or the other of the two possible modulating tone signals. The stripped tone signal is applied to an amplifier, shown in the right portion of FIG. 7b, and then to a pair of tone decoders. One such tone decoder is configured to detect the presence of the 7.8 kHz tone signal and the other is configured to detect the presence of the 3.9 kHz tone signal. The 7.8 kHz tone decoder is the one shown in the center of FIG. 7b and the 3.9 tone decoder shown in the lower portion of FIG. 7b. Each uses a LMC567 low power tone decoder IC, such as that provided by National Semiconductor. Each decoder provides a phase detector and VCO to form a phase-licked loop which locks to an input signal having a frequency which is in the control range of the VCO. When the phase-locked loop is locked and the input signal amplitude exceeds an internally preset threshold, a switch to ground is activated on the output pin which is connected to one of the two LEDs, either red or green, to provide the diver with an appropriate color indicating the condition of his air supply.

When the red tone decoder detects the presence of the 7.8 kHz tone signal, it switches its output to ground thereby allowing current to pass through the red LED shown in the upper right hand corner of FIG. 7b. On the other hand, when the green tone decoder detects the presence of a 3.9 kHz tone signal, its output is switched to ground thereby allowing current to pass through the green LED also shown in the right uppermost portion of FIG. 7b. Thus, it will be seen that the difference in tone frequencies is designed merely to provide a way of distinguishing between the two tone signals generated by the transmitter, responsive to the position of the pressure switch 20 and thus responsive to the condition of the air pressure within the diver's tank air supply 12 of FIGS. 1 and 2. In addition to the color difference between the two LEDs, the diver further distinguishes the two different configurations of his air pressure by means of the period between turn "ON" of the respective LEDs as determined by the two different duty cycle periods generated by the tone selector timer of FIG. 6a as previously described. Thus, the configuration shown in FIG. 7b produces a green LED flash every other second during a normal air supply configuration and produces a red light flash every half second from the red LED indicating a low air supply condition as previously described. It is virtually impossible for the diver to ignore this change in both color and flashing frequency that is readily seen through the diver's mask 18 as previously described in conjunction with FIG. 5.

It will now be understood that what has been described herein comprises a low air warning system for scuba divers in which a pressure switch and an electromagnetic transmitter are positioned at or near the high pressure air supply tank of the scuba diver and a corresponding electromagnetic receiver is positioned on the diver's mask. A plenum extending from the receiver, provides a pair of LED light indicators of two different colors which also oscillate at different frequencies, depending upon the condition of the pressure switch in response to the supply of air in the diver's air supply tank. Thus, the present invention overcomes the previously noted deficiencies of the prior art. It provides a low cost, high reliable, low power consumption air supply warning system that obviates the prior art requirement for hardwiring a cable between the air supply tank and the diver's face mask. Such a cable could otherwise significantly interfere with the diver's motion and create a safety hazard which would diminish the advantages from such a low air supply warning system.

A unique electromagnetic transmission and receiving system is disclosed which relies upon magnetic induction between a high Q transmitting antenna and a high Q receiving antenna in the form of LC tank circuits described herein. One of the novelties of the present invention is the use of frequency modulation and the use of distinct modulating tone frequencies which produce one or the other of two signals to activate one or the other of two LEDs of different colors and at different activation frequencies. A change in both the color and frequency of the flashing light to virtually assure that the diver cannot ignore a change in the status of his air supply when it has been reduced sufficiently to fall below a threshold that is sensed by a pressure switch attached to a valve on the tank.

Those having skill in the art to which the present invention pertains will now, as a result of the applicants' teaching herein, perceive various modifications and additions which may be made to the invention. By way of example, the specific electromagnetic transmitter and receiver described herein may be modified to utilize other schemes for activating either of two different LEDs, as well as other schemes for transmission of electromagnetic energy from the transmitter to the receiver. Furthermore, other mechanical configurations for the transmitter and receiver and the placement of the receiver with respect to the diver's field of view may be utilized, without significantly altering the general concept of the present invention and the advantages derived therefrom. Accordingly, all such modifications and additions are deemed to be within the scope of the invention, which is to be limited only by the claims appended hereto and their equivalents.

We claim:

1. A low air warning system for use by scuba divers; the system comprising:
    an air pressure sensor adapted for connection to an air supply tank and responsive to the reduction of air in said tank below a predetermined threshold to produce an electrical manifestation thereof;
    an electromagnetic energy transmitter connected to said sensor for generating a first signal indicative of air supply in said tank above said threshold and a second signal indicative of air supply in said tank below said threshold; and
    an electromagnetic energy receiver adapted for being positioned adjacent a diving mask and having a circuit for receiving said first and second signals when said mask is mounted on a diver's face, said circuit having at least one visual display device within the field of view of said mask, the circuit producing a first visual manifestation in said display device in response to said first signal and a second visual manifestation in said display device in response to said second signal, said first and second visual manifestations being readily distinguishable from one another.

2. The system recited in claim 1 wherein said transmitter and said receiver each comprises a narrow-band tuned circuit including an inductor for respective transmission and reception of a preselected frequency signal under water.

3. The system recited in claim 1 wherein said first signal comprises a carrier signal frequency modulated by a first tone signal and said second signal comprises said carrier signal frequency modulated by a second tone signal, said first and second tone signals having different frequencies and different duty cycles.

4. The system recited in claim 1 wherein said display device comprises a pair of light-emitting diodes of different colors.

5. The system recited in claim 1 wherein said first visual manifestation comprises a first color light having a first flashing frequency and said second visual manifestation comprises a second color light having a second flashing frequency, said second flashing frequency being at least twice said first flashing frequency.

6. An improved scuba diving system of the type having an air supply tank, a primary air regulator connected to the tank and a diving mask having a face plate; the improvement comprising:
    an air pressure sensor connected to said primary air regulator for responding to the air pressure within said tank by generating a first switch activation when said air pressure is below a predetermined threshold and a second switch activation when said air pressure is above said threshold;
    a transmitter electrically connected to said sensor for radiating first and second electromagnetic signals corresponding to said first and second switch activations, respectively;
    a receiver in wireless communication with said transmitter for receiving said first and second electromagnetic signals and producing corresponding first and second light flashing displays, respectively;
    said receiver being positioned adjacent said diving mask and producing said displays at said face plate.

7. The improvement recited in claim 6 wherein said first signal comprises a carrier signal frequency modulated by a first tone signal and said second signal comprises said carrier signal frequency modulated by a second tone signal, said first and second tone signals having different frequencies and different duty cycles.

8. The system recited in claim 6 wherein said flashing displays have different respective colors.

9. The system recited in claim 6 wherein said flashing displays have different on and off periods.

10. The improvement recited in claim 6 wherein each of said electromagnetic signals comprises a frequency-modulated carrier having one of at least two respective modulating tone signals and wherein said transmitter comprises a tone selector for selecting a modulating tone signal corresponding to said switch activation and wherein said receiver comprises a pair of tone signal decoder circuits for flashing a corresponding one of said first and second displays depending upon the tone signal modulating said carrier.

11. A visual alarm system for warning a diver of a potentially dangerous condition while under water; the system comprising:
    a condition sensor responsive to a dangerous condition to produce an electrical effect;

a transmitter and a receiver; said transmitter being in electrical communication with said sensor for generating either of at least two distinct electromagnetic radiations depending upon the status of said sensor; said receiver being positioned relative to said transmitter for receiving said radiations and for controlling a display in accordance with the radiation received from said transmitter;

a display in electrical communication with said receiver and having at least one source for generating different forms of light signals depending upon which of said radiations is received by said receiver, said light-generating source being positioned in the diver's field of view adjacent the face of the diver to assure diver recognition of said light signals and of said potentially dangerous condition; and water-activated switches for activating said transmitter and said receiver automatically when said system is under water.

12. The visual alarm system recited in claim 11 wherein said receiver and said display are mounted on a diving mask.

13. The visual alarm system recited in claim 11 wherein said receiver and said transmitter each has a magnetic coil and a capacitor tank circuit tuned to a preselected matching frequency for electromagnetic transmission from said transmitter to said receiver by means of signals imposed on a time-varying magnetic field.

14. The visual alarm system recited in claim 13 wherein each of said receiver and transmitter comprises an inductive-capacitive tank circuit including said magnetic coil and having a Q of at least 40.

15. The visual alarm system recited in claim 13 wherein said frequency is about 250 kHz.

16. An alarm system for a scuba diver comprising:

a sensor for sensing the status of a critical parameter;

an alarm device mounted adjacent the diver's head for gaining the diver's attention; and a wireless transmitter and receiver combination responsive to said sensor for generating an alarm indication adjacent the diver's head as warranted by the status of said critical parameter;

said transmitter and receiver combination having frequency-matched inductive coils for electromagnetic transmission from said transmitter to said receiver by means of a time-varying magnetic field.

* * * * *